US008585855B2

(12) United States Patent
Jiang et al.

(10) Patent No.: US 8,585,855 B2
(45) Date of Patent: *Nov. 19, 2013

(54) METHOD FOR MAKING TOUCH PANEL

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 406 days.

This patent is subject to a terminal disclaimer.

(21) Appl. No.: 12/286,175

(22) Filed: Sep. 29, 2008

(65) Prior Publication Data

US 2009/0159188 A1    Jun. 25, 2009

(30) Foreign Application Priority Data

Dec. 21, 2007    (CN) .......................... 2007 1 0125406

(51) Int. Cl.
*B29C 65/02*    (2006.01)
(52) U.S. Cl.
USPC .......................................... 156/281; 156/247
(58) Field of Classification Search
USPC .................................................. 156/281, 247
See application file for complete search history.

(56) References Cited

U.S. PATENT DOCUMENTS

| 4,659,873 | A |  | 4/1987  | Gibson et al. |
| 4,922,061 | A |  | 5/1990  | Meadows et al. |
| 4,933,660 | A |  | 6/1990  | Wynne, Jr. |
| 5,181,030 | A |  | 1/1993  | Itaya et al. |
| 5,223,120 | A | * | 6/1993 | Kojima et al. ................ 205/317 |
| 5,853,877 | A |  | 12/1998 | Shibuta |
| 5,861,583 | A |  | 1/1999  | Schediwy et al. |
| 5,931,764 | A |  | 8/1999  | Freeman et al. |
| 6,373,472 | B1 |  | 4/2002 | Palalau et al. |

(Continued)

FOREIGN PATENT DOCUMENTS

| CN | 2539375 | 3/2003 |
| CN | 1447279 | 10/2003 |

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003, 32(8) (lines from the 4th line to 35th line in the right column of p. 507 may be relevant).

(Continued)

*Primary Examiner* — Katarzyna Wyrozebski Lee
*Assistant Examiner* — Vishal I Patel
(74) *Attorney, Agent, or Firm* — Altis & Wispro Law Group, Inc.

(57) ABSTRACT

A method for making a touch panel includes the steps of: (a) providing a flexible substrate; (b) applying at least one carbon nanotube layer on the flexible substrate; (c) heat-pressing the carbon nanotube layer on the flexible substrate; (d) locating two electrodes on opposite ends of the flexible substrate; (e) placing an insulative layer on edges of a first surface of the flexible substrate, the first surface having the carbon nanotube layer formed thereon; and (f) securing the first electrode plate to a second electrode plate, with the insulative layer located between the first electrode plate and the second electrode plate, and wherein the carbon nanotube layer of the first electrode plate is adjacent to a carbon nanotube layer of the second electrode plate.

20 Claims, 5 Drawing Sheets

(56) References Cited

U.S. PATENT DOCUMENTS

| | | |
|---|---|---|
| 6,423,583 B1 | 7/2002 | Avouris et al. |
| 6,628,269 B2 | 9/2003 | Shimizu |
| 6,629,833 B1 | 10/2003 | Ohya et al. |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,068,261 B2* | 6/2006 | Kubo et al. ............. 345/173 |
| 7,071,927 B2 | 7/2006 | Blanchard |
| 7,084,933 B2 | 8/2006 | Oh et al. |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1* | 3/2004 | Jiang et al. ............. 502/182 |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kawase et al. |
| 2005/0209392 A1* | 9/2005 | Luo et al. ............. 524/496 |
| 2006/0010996 A1 | 1/2006 | Jordan et al. |
| 2006/0022221 A1* | 2/2006 | Furukawa et al. ............. 257/222 |
| 2006/0044284 A1 | 3/2006 | Tanabe |
| 2006/0061704 A1 | 3/2006 | Hayano et al. |
| 2006/0073089 A1* | 4/2006 | Ajayan et al. ............. 423/447.2 |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1* | 12/2006 | Spath et al. ............. 345/173 |
| 2006/0274049 A1 | 12/2006 | Spath et al. |
| 2006/0275956 A1* | 12/2006 | Konesky ............. 438/128 |
| 2006/0278444 A1 | 12/2006 | Binstead |
| 2006/0292360 A1* | 12/2006 | Hays et al. ............. 428/323 |
| 2007/0065651 A1* | 3/2007 | Glatkowski et al. ............. 428/297.4 |
| 2007/0075619 A1 | 4/2007 | Jiang et al. |
| 2007/0081681 A1 | 4/2007 | Yu et al. |
| 2007/0085838 A1 | 4/2007 | Ricks et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0284987 A1* | 12/2007 | Liu et al. ............. 313/311 |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0063587 A1* | 3/2008 | Strano et al. ............. 423/447.1 |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0227360 A1* | 9/2008 | Liu et al. ............. 445/46 |
| 2008/0238882 A1 | 10/2008 | Sivarajan et al. |
| 2008/0248235 A1* | 10/2008 | Feng et al. ............. 428/113 |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153514 A1 | 6/2009 | Jiang et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |
| 2012/0105371 A1 | 5/2012 | Hotelling et al. |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |

(56) References Cited

FOREIGN PATENT DOCUMENTS

| | | |
|---|---|---|
| JP | S61-231626 | 10/1986 |
| JP | 61-283918 | 12/1986 |
| JP | S62-63332 | 3/1987 |
| JP | 62-139028 | 6/1987 |
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 10-246605 | 9/1998 |
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

George Gruner, "Carbon Nanonets Spark New Electronics", Scientific American, pp. 76-83, May 2007.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Yu Xiang, Technique of Touch Panel & the Production of Resistance-type Touch Panel Insulation Dot, Journal of Longyan Teachers College, p. 25-26, vol. 22, No. 6, 2004.

Fan et al. "Self-Oriented Regular Arrays of Carbon Nanotubes and Their Field Emission Properties". Science, vol. 283, (1999);pp. 512-514.

(56) References Cited

OTHER PUBLICATIONS

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

Susuki et al."Investigation of physical and electric properties of silver pastes as binder for thermoelectric materials". Review of Scientific Instruments,76,(2005);pp. 023907-1 to 023907-5.

R Colin Johnson, "Carbon nanotubes aim for cheap, durable touch screens",Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

Zhungchun Wu et al., "Transparent, Conductive Carbon Nanotube Films", Science, vol. 305, pp. 1273-1276, Aug. 27, 2004.

* cited by examiner

METHOD FOR MAKING TOUCH PANEL

RELATED APPLICATIONS

This application is related to commonly-assigned applications entitled, "TOUCH PANEL", U.S. application Ser. No. 12/286,266, filed Sep. 29, 2008; "TOUCH PANEL", U.S. application Ser. No. 12/286,141, filed Sep. 29, 2008; "TOUCH PANEL AND DISPLAY DEVICE USING THE SAME", U.S. application Ser. No. 12/286,189, filed Sep. 29, 2008; "TOUCH PANEL AND DISPLAY DEVICE USING THE SAME", U.S. application Ser. No. 12/286,181, filed Sep. 29, 2008; "TOUCH PANEL AND DISPLAY DEVICE USING THE SAME", U.S. application Ser. No. 12/286,176, filed Sep. 29, 2008; "TOUCH PANEL AND DISPLAY DEVICE USING THE SAME", U.S. application Ser. No. 12/286,166, filed Sep. 29, 2008; "TOUCH PANEL AND DISPLAY DEVICE USING THE SAME", U.S. application Ser. No. 12/286,178, filed Sep. 29, 2008; "TOUCH PANEL AND DISPLAY DEVICE USING THE SAME", U.S. application Ser. No. 12/286,148, filed Sep. 29, 2008; "TOUCHABLE CONTROL DEVICE", U.S. application Ser. No. 12/286,140, filed Sep. 29, 2008; "TOUCH PANEL AND DISPLAY DEVICE USING THE SAME", U.S. application Ser. No. 12/286,154, filed Sep. 29, 2008; "TOUCH PANEL AND DISPLAY DEVICE USING THE SAME", U.S. application Ser. No. 12/286,216, filed Sep. 29, 2008; "TOUCH PANEL AND DISPLAY DEVICE USING THE SAME", U.S. application Ser. No. 12/286,152, filed Sep. 29, 2008; "TOUCH PANEL AND DISPLAY DEVICE USING THE SAME", U.S. application Ser. No. 12/286,145, filed Sep. 29, 2008; "TOUCH PANEL, METHOD FOR MAKING THE SAME, AND DISPLAY DEVICE ADOPTING THE SAME", U.S. application Ser. No. 12/286,155, filed Sep. 29, 2008; "TOUCH PANEL AND DISPLAY DEVICE USING THE SAME", U.S. application Ser. No. 12/286,179, filed Sep. 29, 2008; "TOUCH PANEL, METHOD FOR MAKING THE SAME, AND DISPLAY DEVICE ADOPTING THE SAME", U.S. application Ser. No. 12/286,228, filed Sep. 29, 2008; "TOUCH PANEL AND DISPLAY DEVICE USING THE SAME", U.S. application Ser. No. 12/286,153, filed Sep. 29, 2008; "TOUCH PANEL AND DISPLAY DEVICE USING THE SAME", U.S. application Ser. No. 12/286,184, filed Sep. 29, 2008; "METHOD FOR MAKING TOUCH PANEL", U.S. application Ser. No. 12/286,175, filed Sep. 29, 2008; "METHOD FOR MAKING TOUCH PANEL", U.S. application Ser. No. 12/286,195, filed Sep. 29, 2008; "TOUCH PANEL AND DISPLAY DEVICE USING THE SAME", U.S. application Ser. No. 12/286,160, filed Sep. 29, 2008; "TOUCH PANEL AND DISPLAY DEVICE USING THE SAME", U.S. application Ser. No. 12/286,220, filed Sep. 29, 2008; "TOUCH PANEL AND DISPLAY DEVICE USING THE SAME", U.S. application Ser. No. 12/286,227, filed Sep. 29, 2008; "TOUCH PANEL AND DISPLAY DEVICE USING THE SAME", U.S. application Ser. No. 12/286,144, filed Sep. 29, 2008; "TOUCH PANEL AND DISPLAY DEVICE USING THE SAME", U.S. application Ser. No. 12/286,218, filed Sep. 29, 2008; "TOUCH PANEL AND DISPLAY DEVICE USING THE SAME", U.S. application Ser. No. 12/286,142, filed Sep. 29, 2008; "TOUCH PANEL AND DISPLAY DEVICE USING THE SAME", U.S. application Ser. No. 12/286,241, filed Sep. 29, 2008; "TOUCH PANEL, METHOD FOR MAKING THE SAME, AND DISPLAY DEVICE ADOPTING THE SAME", U.S. application Ser. No. 12/286,151, filed Sep. 29, 2008; "ELECTRONIC ELEMENT HAVING CARBON NANOTUBES", U.S. application Ser. No. 12/286,143, filed Sep. 29, 2008; and "TOUCH PANEL, METHOD FOR MAKING THE SAME, AND DISPLAY DEVICE ADOPTING THE SAME", U.S. application Ser. No. 12/286,219, filed Sep. 29, 2008. The disclosures of the above-identified applications are incorporated herein by reference.

BACKGROUND

1. Field of the Invention

The present invention relates to a method for making a flexible touch panel.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including resistance, capacitance, infrared, and surface sound-wave types have been developed. Due to their high accuracy and low cost of production, resistance-type touch panels have been widely used.

A conventional resistance-type touch panel includes an upper substrate, a transparent upper conductive layer formed on a lower surface of the upper substrate, a lower substrate, a transparent lower conductive layer formed on an upper surface of the lower substrate, and a plurality of dot spacers formed between the transparent upper conductive layer and the transparent lower conductive layer. The transparent upper conductive layer and the transparent lower conductive layer are formed of electrically conductive indium tin oxide (ITO).

In operation, an upper surface of the upper substrate is pressed with a finger, a pen, or a like tool, and visual observation of a screen on the liquid crystal display device provided on a back side of the touch panel is provided. This causes the upper substrate to be deformed, and the upper conductive layer thus comes in contact with the lower conductive layer at the position where the pressing occurs. Voltages are separately applied by an electronic circuit to the transparent upper conductive layer and the transparent lower conductive layer. Thus, the deformed position can be detected by the electronic circuit.

Current touch panels are not flexible because they have a glass substrate. However, flexible display devices are becoming more popular. Additionally, the transparent conductive layer of current touch panels usually have an optically transparent conductive layer (e.g., ITO layer), which is generally formed by means of ion-beam sputtering, and the method is relatively complicated. Further, the ITO layer has generally poor mechanical durability, low chemical endurance, and uneven resistance over an entire area of the touch panel. Additionally, the ITO layer has relatively low transparency. All the above-mentioned problems of the ITO layer tend to yield a touch panel with low sensitivity, accuracy, and brightness.

What is needed, therefore, is to provide a method for making a low-cost touch panel that is flexible and easy to manufacture.

SUMMARY

A method for making a touch panel includes the steps of: (a) providing a flexible substrate; (b) applying at least one carbon nanotube layer on the flexible substrate; (c) heat-pressing the carbon nanotube layer on the flexible substrate; (d) locating two electrodes on opposite ends of the flexible substrate; (e) placing an insulative layer on edges of a first surface of the flexible substrate, the first surface having the carbon nanotube layer formed thereon; and (f) securing the first electrode plate to a second electrode plate, with the insulative layer located between the first electrode plate and the second electrode plate, and wherein the carbon nanotube layer of the first electrode plate is adjacent to a carbon nanotube layer of the second electrode plate.

Other advantages and novel features of the present method for making touch panel will become more apparent from the following detailed description of the present embodiments, when taken in conjunction with the accompanying drawings.

BRIEF DESCRIPTION OF THE DRAWINGS

Many aspects of the present method for making touch panel can be better understood with reference to the following drawings. The components in the drawings are not necessarily to scale, the emphasis instead being placed upon clearly illustrating the principles of the present method for making touch panel.

Figure 1:
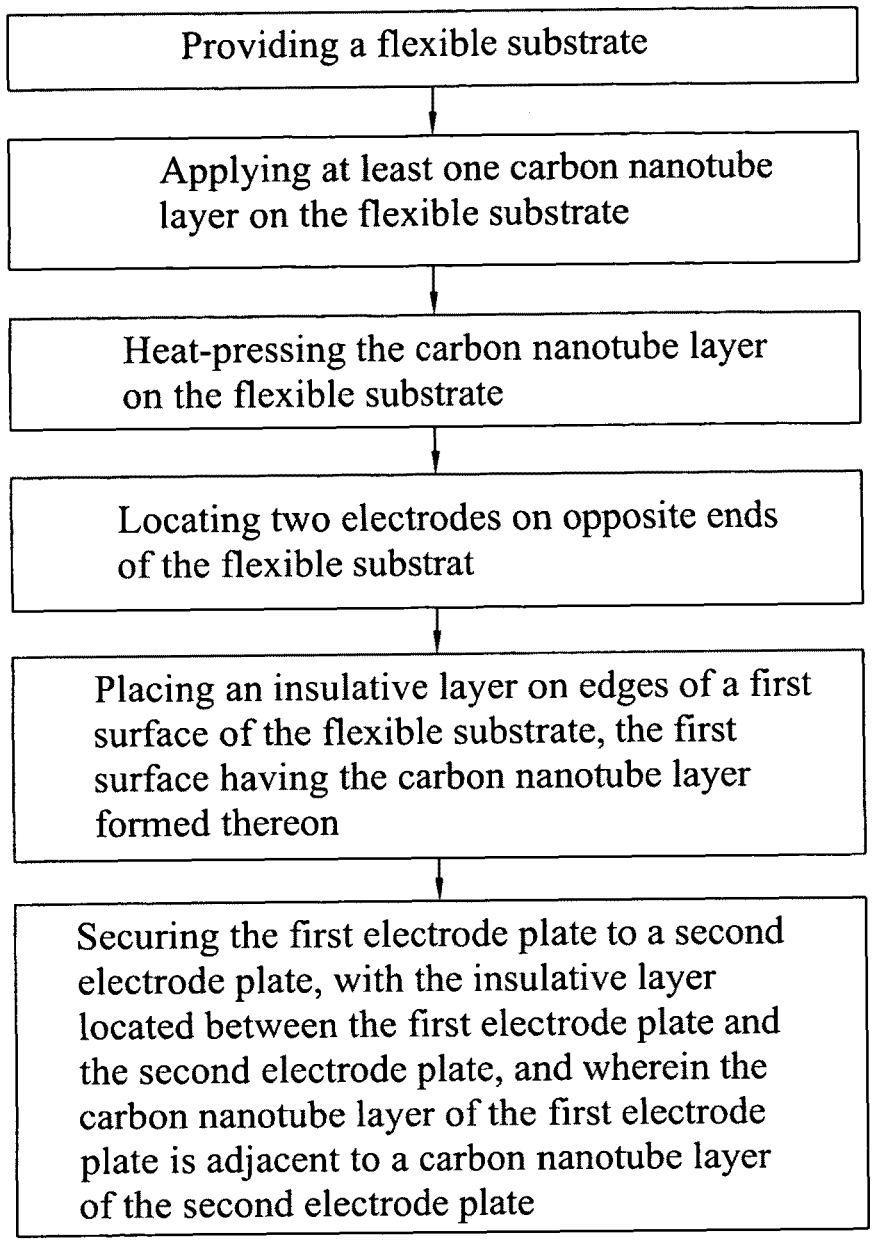
FIG. 1 is a chart of a method for making a touch panel, in accordance with a present embodiment.

Corresponding reference characters indicate corresponding parts throughout the several views. The exemplifications set out herein illustrate at least one exemplary embodiment of the present method for making touch panel, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present method for making a touch panel.

Referring to FIG. 1, a method for making the touch panel is provided in the present embodiment. The method includes the following steps of: (a) providing a flexible substrate; (b) forming at least one carbon nanotube layer on the flexible substrate; (c) heat-pressing the carbon nanotube layer on the flexible substrate; (d) locating two electrodes on opposite ends of the flexible substrate; (e) placing an insulative layer on edges of a first surface of the flexible substrate, the first surface having the carbon nanotube layer formed thereon; and (f) securing the first electrode plate to a second electrode plate, with the insulative layer located between the first electrode plate and the second electrode plate, and wherein the carbon nanotube layer of the first electrode plate is adjacent to a carbon nanotube layer of the second electrode plate.

In step (a), the flexible substrate has a planar structure. A thickness of the flexible substrate approximately ranges from 0.01 millimeter to 1 centimeter. The substrate is made of flexible transparent materials (e.g., plastics, resin). The flexible material can be selected from the group consisting of polycarbonate (PC), polymethyl methacrylate (PMMA), polyethylene terephthalate (PET), ployethersulfone (PES), polyimide (PI), cellulose ester, acrylic resin, benzocyclobutene (BCB), and poly vinyl chloride (PVC). In the embodiment, the substrate is made of PET film. Thickness, width, and length of the PET film are respectively 2 millimeters, 20 centimeters, and 30 centimeters.

A step (g) of fabricating at least one carbon nanotube film is further provided after step (a). Step (g) includes the following steps of: (g1) providing an array of carbon nanotubes; and (g2) pulling out the carbon nanotube film from the array of carbon nanotubes by using a tool (e.g., adhesive tape, pliers, tweezers, or another tool allowing multiple carbon nanotubes to be gripped and pulled simultaneously).

In step (g1), a given super-aligned array of carbon nanotubes can be formed by the substeps of: (g11) providing a substantially flat and smooth substrate; (g12) forming a catalyst layer on the substrate; (g13) annealing the substrate with the catalyst layer in air at a temperature in the approximate range from 700° C. to 900° C. for about 30 to 90 minutes; (g14) heating the substrate with the catalyst layer to a temperature in the approximate range from 500° C. to 740° C. in a furnace with a protective gas therein; and (g15) supplying a carbon source gas to the furnace for about 5 minutes to 30 minutes and growing the super-aligned array of carbon nanotubes on the substrate.

In step (g11), the substrate can be a P-type silicon wafer, an N-type silicon wafer, or a silicon wafer with a film of silicon dioxide thereon. In this embodiment, a 4-inch P-type silicon wafer is used as the substrate.

In step (g12), the catalyst can be made of iron (Fe), cobalt (Co), nickel (Ni), or any alloy thereof.

In step (g14), the protective gas can comprise of at least one of nitrogen ($N_2$), ammonia ($NH_3$), and a noble gas. In step (b15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array of carbon nanotubes includes a plurality of carbon nanotubes parallel to each other and approximately perpendicular to the substrate. The carbon nanotubes in the array can be selected from a group consisting of single-walled carbon nanotubes, double-walled carbon nanotubes, and multi-walled carbon nanotubes. Diameters of the single-walled carbon nanotubes approximately range from 0.5 nanometers to 50 nanometers. Diameters of the double-walled carbon nanotubes approximately range from 1 nanometer to 50 nanometers. Diameters of the multi-walled carbon nanotubes approximately range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (g2), the carbon nanotube film can be formed by the substeps of: (g21) selecting one or more carbon nanotubes having a predetermined width from the array of carbon nanotubes; and (g22) pulling the carbon nanotubes to form carbon nanotube segments 143 at an even/uniform speed to achieve a uniform carbon nanotube film.

Figure 2:
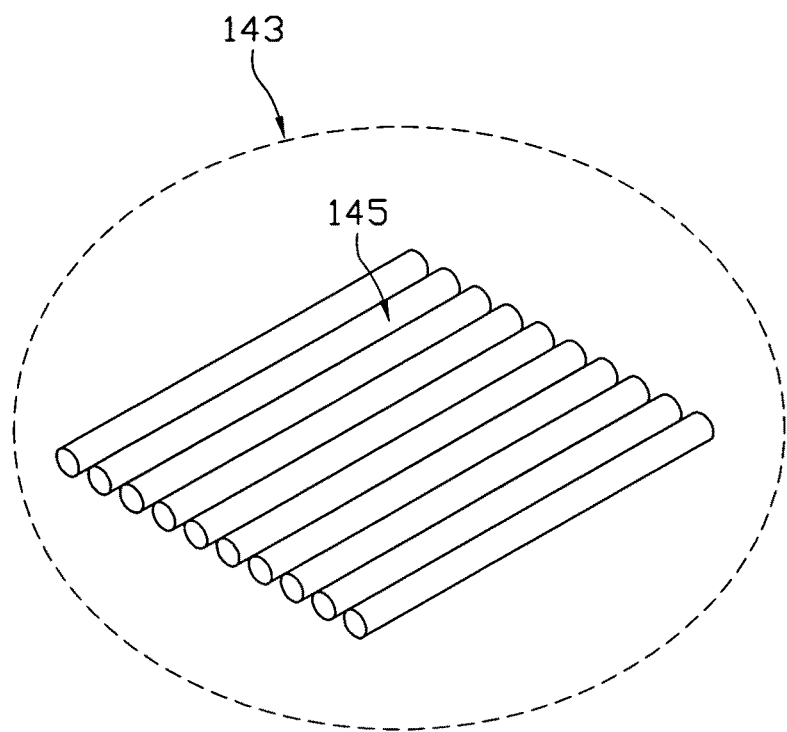
FIG. 2 is a structural schematic of a carbon nanotube segment.
Figure 3:
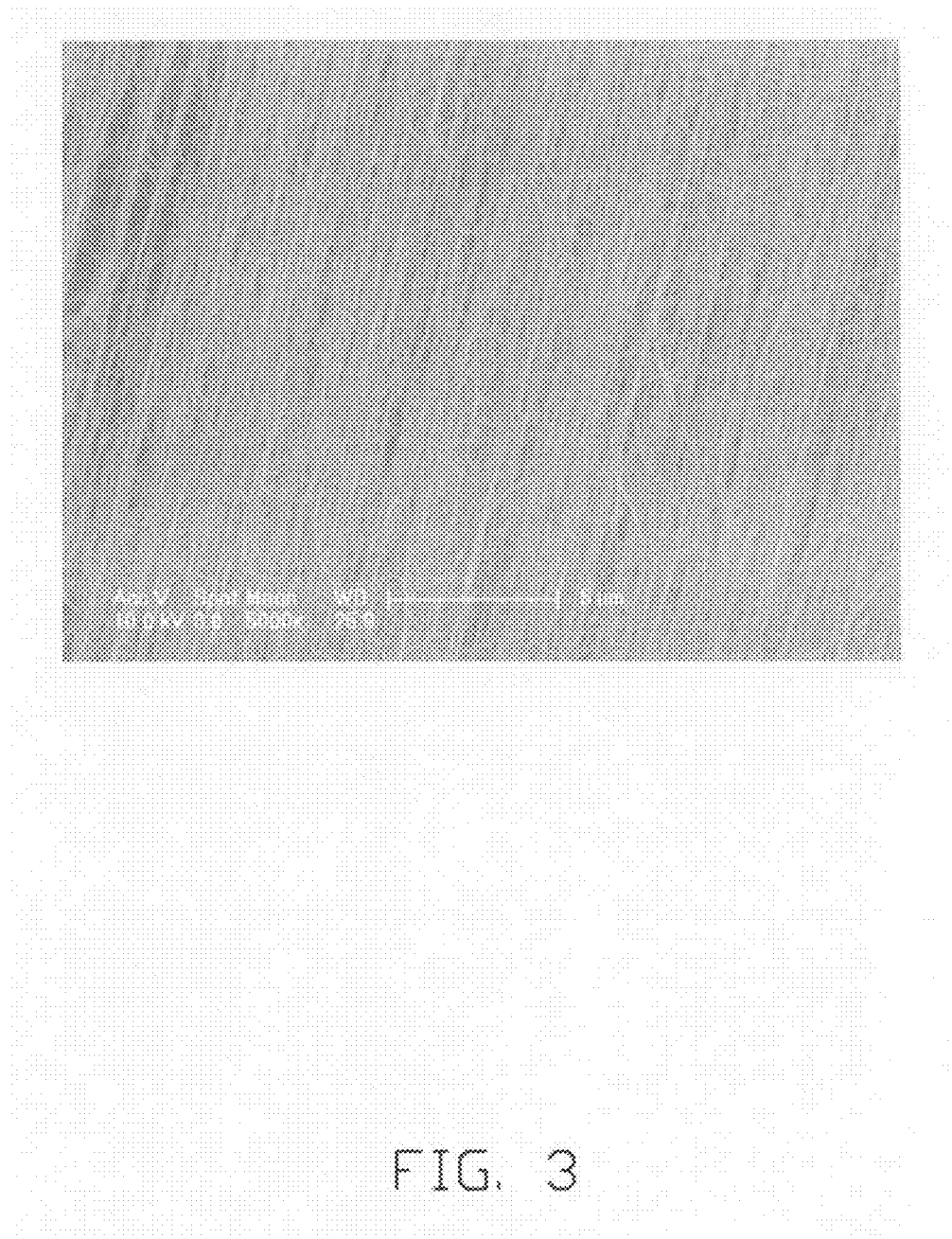
FIG. 3 shows a Scanning Electron Microscope (SEM) image of a carbon nanotube film of the transparent conductive layer used in the touch panel of FIG. 1.

In step (g21), the carbon nanotube segments having a predetermined width can be selected by using an adhesive tape as the tool to contact the super-aligned array. Referring to FIG. 2 and FIG. 3, each carbon nanotube segment 143 includes a plurality of carbon nanotubes 145 parallel to each other. In step (g22), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to van der Waals attractive force between ends of adjacent carbon nanotube segments 143. This process of drawing ensures a substantially continuous and uniform carbon nanotube film can be formed. The carbon nanotube film includes a plurality of carbon nanotubes 145 joined end by end. The carbon nanotubes 145 in the carbon nanotube film are all substantially parallel to the pulling/drawing direction of the carbon nanotube film. The carbon nanotube film formed by the pulling/drawing method has superior uniformity of thickness and conductivity over a typical disordered carbon nanotube film. Further, the pulling/drawing method is simple, fast, and suitable for industrial applications. It is to be understood that some variation can occur in the orientation of the nanotubes in the film as can be seen in FIG. 3.

The width of the carbon nanotube film depends on a size of the carbon nanotube array. The length of the carbon nanotube film can be arbitrarily set, as desired. When the substrate is a 4-inch P-type silicon wafer, the width of the carbon nanotube film approximately ranges from 0.5 nanometers to 10 centimeter, and the thickness of the carbon nanotube film approximately ranges from 0.5 nanometers to 100 micrometers. The carbon nanotubes 145 in the carbon nanotube film can be selected from a group consisting of single-walled carbon nanotubes, double-walled carbon nanotubes, and multi-walled carbon nanotubes. Diameters of the single-walled carbon nanotubes approximately range from 0.5 nanometers to 50 nanometers. Diameters of the double-walled carbon nanotube approximately range from 1 nanometer to 50 nanometers. Diameters of the multi-walled carbon nanotube approximately range from 1.5 nanometers to 50 nanometers.

Unlike previous methods for making an ITO film, the present method does not require a vacuum environment and heat processing, due to the carbon nanotube film being obtained by pulling out from an array of carbon nanotubes 145. Thus, the carbon nanotube layer formed by one or more carbon nanotube films and used as the transparent conductive layer has the advantage of being low cost, environmentally safe, and energy efficient.

In step (b), the carbon nanotube layer is used as a transparent conductive layer. The carbon nanotube layer comprised one or more carbon nanotube films. The carbon nanotube films comprise a plurality of oriented carbon nanotubes 145. The carbon nanotube layer can be comprised of a carbon nanotube film, a plurality of coplanar carbon nanotube films that may or my not overlap. Each carbon nanotube film comprises of carbon nanotubes parallel to the pulling direction. In some embodiments, at least two carbon nanotube layers are stacked and arranged along the same orientation. Moreover, the conductive layer can also include at least two stacked carbon nanotube layers. An angle between the aligned directions of the carbon nanotubes 145 in adjacent two carbon nanotube layers approximately ranges from above 0° to less than or equal to 90°. In other embodiments, there may be only one carbon nanotube layer with one or more carbon nanotube films, and when there are multiple carbon nanotube films, they are either aligned or not aligned.

It is noted that the carbon nanotube film obtained in step (g) is adherent in nature, because the carbon nanotubes 145 in the super-aligned carbon nanotube array have a high purity and a high specific surface area. As such, the carbon nanotube film can be adhered directly to a surface of the substrate. In the present embodiment, one of laying at least one carbon nanotube film, contactingly laying at least two carbon nanotube films, or stacking at least two carbon nanotube films on a surface of the flexible substrate is used, so as to form the at least one carbon nanotube layer.

Understandably, the method for forming the carbon nanotube layer can also includes the substeps of: (b1) laying a carbon nanotube film, contactingly laying at least two carbon nanotube films side by side or stacking at least two carbon nanotube films on a surface of a supporter; (b2) removing the supporter to form a free-standing carbon nanotube film structure; and (b3) overlapping or placing the carbon nanotube film structure on a surface of the flexible substrate, so as to form the at least one carbon nanotube layer.

In step (b1), the supporter is a substrate or a frame. Because of the carbon nanotube film's adhesive nature, it adheres naturally adheres to the supporter. It is to be noted that a knife, or other cutting instrument, is used to cut the carbon nanotube film so that the carbon nanotube film has the same size as the supporter.

In step (b), any or all of the carbon nanotube film, the carbon nanotube film structure, or the carbon nanotube layer can be treated with an organic solvent. Specifically, the carbon nanotube film, the carbon nanotube film structure, or the carbon nanotube layer can be treated by dropping the organic solvent onto the carbon nanotube film, the carbon nanotube film structure, or the carbon nanotube layer to soak the entire surface thereof. Alternatively, the carbon nanotube film, the carbon nanotube film structure, or the carbon nanotube layer can be put into a container, which is filled with the needed organic solvent. The organic solvent is volatilizable and can, suitably, be selected from a group consisting of ethanol, methanol, acetone, dichloroethane, chloroform, and any suitable mixture thereof. In the present embodiment, the organic solvent is ethanol. The supporter is a substrate. After being soaked by the organic solvent, microscopically, carbon nanotube strings will be formed by adjacent carbon nanotubes, or portions thereof, bundling in the carbon nanotube film, due to the surface tension of the organic solvent. In one aspect, part of the carbon nanotubes in the untreated carbon nanotube film that are not adhered on the substrate will adhere on the substrate after the organic solvent treatment due to the surface tension of the organic solvent. Then the contacting area of the carbon nanotube film with the substrate will increase, and thus, the carbon nanotube film can adhere to the surface of the first substrate more firmly. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

Moreover, a step of cleaning the flexible substrate and coating it with low melting material is executed before the step (b). The cleaning is done using an organic solvent on the flexible substrate. The organic solvent is selected from ethanol, methanol, acetone, or any other suitable solvent. Any contaminants on the flexible substrate are removed in the cleaning step. A sputtering method or a spraying method is used to coat the low-melt material in the process of coating. The melting point of the low melting material is lower than that of the flexible substrate and the carbon nanotube layer. The low melting material is polymethyl methacrylate (PMMA). In the present embodiment, the PMMA is uniformly coated onto a surface of the flexible substrate.

Figure 4:
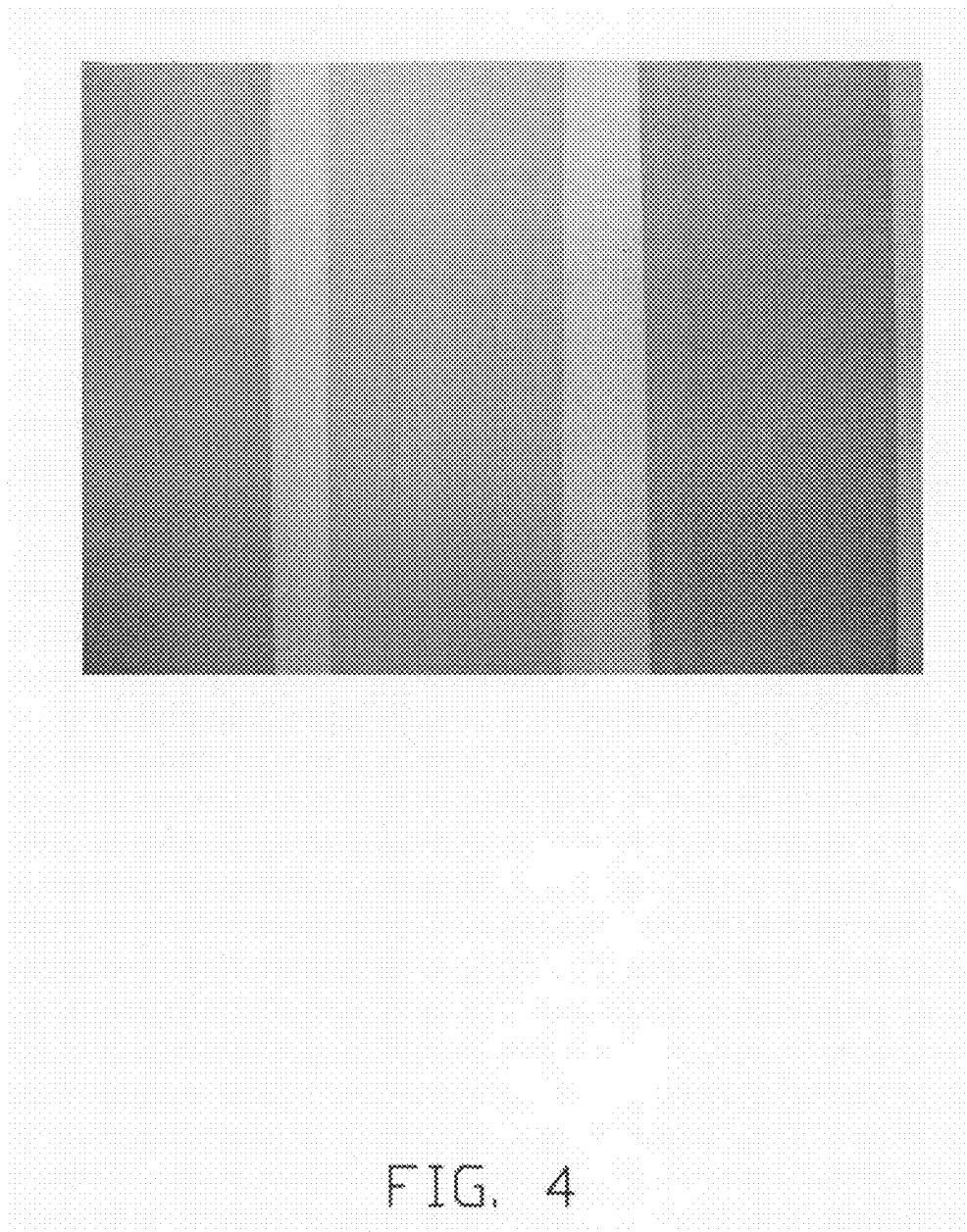
FIG. 4 shows a photo of a heat-pressed carbon nanotube layer of the touch panel.
Figure 5:
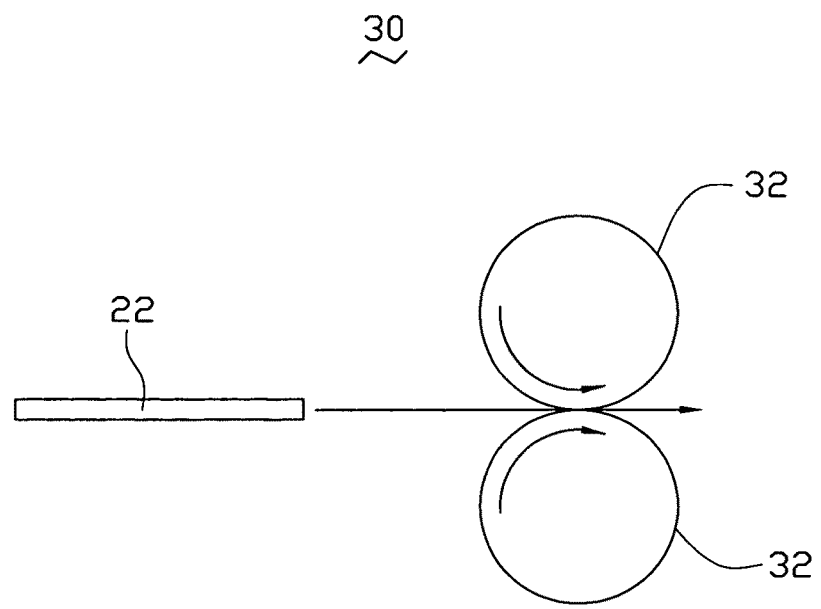
FIG. 5 shows a schematic view of the heat-pressed process used to form the heat-pressed carbon nanotube layer shown in FIG. 4.

Referring to FIGS. 4 and 5, step (c) is carried by a hot-press device 30, and specifically includes the substeps of: (c1)

locating the flexible substrate 22 coated with at least one carbon nanotube layer on the hot-press device 30, (c2) heating a pressing device of the hot-press device 30; and (c3) squeezing of the flexible substrate 22 by the pressing device 32.

In step (c1), the hot-pressed device 30 includes a pressing device 32 and a heating device (not shown). In the present embodiment, the hot-press device 30 is a hot-press machine, and the pressing device 32 includes two rollers.

In step (c2), the heating device is used to heat the pressing device 32. A temperature of the pressing device 32 approximately ranges from 110° C. to 120° C.

In step (c3), the flexible substrate 22 coated the at least one carbon nanotube layer is slowly passed through the pressing device 32. The speed of the flexible substrate 22 is about from 1 millimeter per minute to 10 meters per minute. In the present embodiment, a certain pressure is applied to the flexible substrate 22, by the heated roller, to soften it. As such, air between the carbon nanotube layer and the flexible substrate 22 is pressed out of the flexible substrate 22, and the carbon nanotube layer firmly adheres on the surface of the flexible substrate 22.

It is to be noted that when the low melting material is sandwiched between the flexible substrate 22 and the carbon nanotube layer, in the process of pressing the flexible substrate 22, the carbon nanotube layer is adhered to the flexible substrate 22 by the low melting material.

In step (d), the electrodes are strip-shaped, and formed by any one or more of silver, copper and the like metal, carbon nanotube film, or conductive silver paste. In the present embodiment, the two electrodes are made of conductive silver paste. The method for making the two electrodes includes the following steps of: (d1) coating a conductive silver paste on opposite ends of the carbon nanotube layer or on two opposite ends of the substrate by means of screen printing or spraying; (d2) baking the substrate in an oven for 10-60 minutes at a temperature in an approximate range from 100° C. to 120° C. to solidify the conductive silver paste, and thus acquiring a first electrode plate.

In step (e), the insulative layer is made of, for example, insulative resin or any other insulative transparent material. The insulative layer can be formed by coating a layer of insulative adherent agent on the edges of the first electrode plate or the substrate.

In step (f), the second electrode plate, formed by step (a)-step (d), includes a second substrate, a second carbon nanotube layer, and two second electrodes.

In step (f), the arranged directions of the two electrodes of the first electrode plate intersect with that of the two electrodes of the second electrode plate.

Furthermore, the method for making the touch panel can further includes the steps of: coating a layer of slurry comprising of a plurality of dot spacers on the portion of the first surface of the first electrode plate or the second electrode plate without the insulative layer defined thereon; and drying the layer of slurry to form a plurality of the dot spacers. The dot spacers can be made of insulative resin or any other insulative transparent material. Insulation between the first electrode plate and the second electrode plate is provided by the insulative layer and the array of dot spacers. It is to be understood that the dot spacers are optional, especially when the size of the touch panel is relatively small.

The touch panel includes a first surface and a second surface opposite to the first surface. The method for making the touch panel can further include forming a transparent protective film on the first surface of the touch panel. The material of the transparent protective film can be silicon nitrides, silicon dioxides, benzocyclobutenes, polyester films, and polyethylene terephthalates. The transparent protective film can be made of slick plastic and receive a surface hardening treatment to protect the touch panel from being scratched when in use. The transparent protective layer can be adhered to the first surface of the touch panel by an adhesive, and the adhesive can be a silver-based slurry. In the present embodiment, the transparent protective film is an adherent polyethylene terephthalates (PET) film, and the adherent PET film can be placed covering the surface of the touch panel to serve as a transparent protective layer.

The touch panel can further include a shielding layer (not shown) located on a second surface of the touch panel. The material of the shielding layer can be indium tin oxide, antimony tin oxide, carbon nanotube film, and other conductive materials. In the present embodiment, the shielding layer is a carbon nanotube film. The carbon nanotube film includes a plurality of carbon nanotubes, and the orientation of the carbon nanotubes therein can be arbitrarily selected. In the present embodiment, the carbon nanotubes in the carbon nanotube film of the shielding layer are arranged along a same direction. The carbon nanotube film is connected to ground and acts as a shield, thus enabling the touch panel 10 to operate without interference (e.g., electromagnetic interference). The shielding layer can be adhered to a second surface of the touch panel by an adhesive such as a silver-based slurry.

It can be understood that one of the first electrode plate and the second electrode plate can be formed by ion beam sputtering or deposition method of the conventional technologies.

Compared with conventional methods for making a touch panel, the present method for making a touch panel has the following advantages. Firstly, because the carbon nanotube layer has superior toughness, high mechanical strength, and uniform conductivity, the carbon nanotube layer can be used as a transparent conductive layer. Furthermore, when a flexible substrate is used in the touch panel, a flexible touch panel is obtained and thus this can be applied to a flexible display element. Secondly, the pulling method for fabricating the carbon nanotube film is simple and the adhesive carbon nanotube film can be directly located on the substrate. The method for fabricating the carbon nanotube film does not require a vacuum environment and a heating process. As such, the touch panel produced by the present method has advantages such as being low cost, environmentally safe, and energy efficient. Thirdly, the carbon nanotube layer and the flexible substrate are attached together by a hot-press process. Thus, the present method reduces the cost of the touch panel and simplifies the fabrication process. Furthermore, the hot-press process is done using a relatively low temperature, and therefore the temperature restriction for the flexible substrate is small. The advantages listed here are by no means exhaustive.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making a touch panel, the method comprising the steps of:
   (a) providing a flexible substrate having a first surface;
   (a1) drawing at least two carbon nanotube films directly from a super-aligned carbon nanotube array;
   (b) applying a transparent carbon nanotube layer on the first surface of the flexible substrate, wherein the transparent carbon nanotube layer is formed by stacking the at least two carbon nanotube films, each of the at least two carbon nanotube films comprises a plurality of carbon nanotubes aligned substantially along a same direction and parallel to the first surface of the flexible substrate, the at least two carbon nanotube films are directly stacked with each other, and an angle is formed between the aligned directions of the carbon nanotubes in adjacent carbon nanotube films;
   (c) heat-pressing the transparent carbon nanotube layer on the flexible substrate;
   (d) locating two electrodes on opposite ends of the flexible substrate;
   (e) placing an insulative layer on edges of the first surface of the flexible substrate, the first surface having the transparent carbon nanotube layer formed thereon to form a first electrode plate;
   (h) repeating steps (a) to (e) to obtain a second electrode plate; and
   (f) securing the first electrode plate to the second electrode plate, with the insulative layer located between the first electrode plate and the second electrode plate, and wherein the transparent carbon nanotube layer of the first electrode plate is adjacent to the transparent carbon nanotube layer of the second electrode plate.

2. The method as claimed in claim 1, wherein each of the at least two carbon nanotube films is fabricated by the steps of:
   (g1) providing an array of carbon nanotubes; and
   (g2) pulling out each of the at least two carbon nanotube films from the array of carbon nanotubes by using a tool.

3. The method as claimed in claim 1, wherein before step (b), a step of cleaning the flexible substrate and coating the flexible substrate with a low melting material is executed.

4. The method as claimed in claim 3, wherein an organic solvent is used to clean the flexible substrate, and the organic solvent comprises ethanol, acetone or a combination thereof.

5. The method as claimed in claim 3, wherein the low melting material is coated on the flexible substrate by sputtering or spraying, and the melting point of the low melting material is lower than that of the flexible substrate and the carbon nanotube layers.

6. The method as claimed in claim 1, wherein (b) comprises the steps of:
   (b1) laying the at least two carbon nanotube films on a surface of a supporter;
   (b2) removing the supporter to form a free-standing carbon nanotube film structure; and
   (b3) placing the carbon nanotube film structure on the first surface of the flexible substrate, so as to form the carbon nanotube layer.

7. The method as claimed in claim 6, wherein in step (b), a step of using an organic solvent to treat the at least two carbon nanotube films, the carbon nanotube film structure, or the carbon nanotube layer is executed.

8. The method as claimed in claim 1, wherein the angle is in a range from above 0° to less than or equal to 90°.

9. The method as claimed in claim 1, wherein the step (c) comprises the substeps of:
   (c1) locating the flexible substrate with the carbon nanotube layer formed thereon in a hot-pressed device;
   (c2) heating a pressing device of the hot-pressed device; and
   (c3) squeezing the flexible substrate by the pressing device.

10. The method as claimed in claim 9, wherein the hot-pressed device comprises two rollers.

11. The method as claimed in claim 1, wherein step (d) further comprises the substeps of:
    (d1) applying a conductive silver paste on the flexible substrate by means of screen printing or spraying; and
    (d2) baking the flexible substrate in an oven for 10-60 minutes at a temperature in an approximate range from 100° C. to 120° C. to solidify the conductive silver paste.

12. The method as claimed in claim 1, wherein step (e) is executed by applying a layer of insulative adherent agent.

13. The method as claimed in claim 1, further comprising the steps of applying a slurry layer comprising a plurality of dot spacers on one of the first or the second electrode plates; and drying the slurry layer.

14. The method as claimed in claim 1, further comprising adhering a transparent protective layer on a first surface of the touch panel by an adhesive, and the adhesive is a silver-based slurry.

15. The method as claimed in claim 14, wherein a material of the transparent protective layer is selected from the group consisting of silicon nitride, silicon dioxide, benzocyclobutenes, polyester film, and polyethylene terephthalate.

16. The method as claimed in claim 14, further comprising placing a shielding layer on a second surface of the touch panel, and a material of the shielding layer is at least one carbon nanotube film, and the at least one carbon nanotube film comprises a plurality of carbon nanotubes arranged along a same direction.

17. The method as claimed in claim 16, wherein the shielding layer is adhered to the second surface of the touch panel by an adhesive, and the adhesive is a silver-based slurry.

18. A method for making a touch panel, the method comprising the steps of:
    (a) providing a flexible substrate having a first surface;
    (b) stacking at least two carbon nanotube films directly on the first surface of the flexible substrate to form a transparent carbon nanotube layer, wherein each of the at least two carbon nanotube films comprises a plurality of carbon nanotubes aligned along a same direction and joined end to end by van der Waals force and parallel to the first surface of the flexible substrate, and the at least two carbon nanotube films are directly in contact with each other, wherein each of the at least two carbon nanotube films are obtained by the steps of:
    providing a substantially flat and smooth substrate;
    forming a catalyst layer on the substrate;
    annealing the substrate with the catalyst layer in air at a temperature in the approximate range from 700° C. to 900° C. for about 30 to 90 minutes;
    heating the substrate with the catalyst layer to a temperature in the approximate range from 500° C. to 740° C. in a furnace with a protective gas therein;
    supplying a carbon source gas to the furnace for about 5 minutes to 30 minutes and growing a super-aligned array of carbon nanotubes on the substrate;
    selecting one or more carbon nanotubes having a predetermined width from the array of carbon nanotubes;

pulling the carbon nanotubes directly from the array of carbon nanotube, to form carbon nanotube segments at an uniform speed to achieve the carbon nanotube film;
(c) heat-pressing the transparent carbon nanotube layer on the flexible substrate;
(d) locating two electrodes on opposite ends of the flexible substrate;
(e) placing an insulative layer on edges of the first surface of the flexible substrate, the first surface having the transparent carbon nanotube layer formed thereon to form a first electrode plate;
(h) repeating steps (a) to (e) to obtain a second electrode plate; and
(f) securing the first electrode plate to the second electrode plate, with the insulative layer located between the first electrode plate and the second electrode plate, and wherein the transparent carbon nanotube layer of the first electrode plate is adjacent to the transparent carbon nanotube layer of the second electrode plate.

19. The method as claimed in claim 18, wherein each of the at least two carbon nanotube films have a width of approximately 10 centimeters.

20. A method for making a touch panel, the method comprising the steps of:
(a) providing a flexible substrate having a surface;
(b) applying a transparent carbon nanotube layer on the surface of the flexible substrate, wherein the transparent carbon nanotube layer is formed by stacking at least two carbon nanotube films, each of the at least two carbon nanotube films comprises a plurality of carbon nanotubes aligned substantially along a same direction and parallel to the surface of the flexible substrate, the at least two carbon nanotube films are directly stacked with each other, and an angle is formed between the aligned directions of the carbon nanotubes in adjacent carbon nanotube films, wherein each of the at least two carbon nanotube films has a width of approximately 10 centimeters;
(c) adhering the carbon nanotube layer adhering firmly on the substrate by dropping a volatilizable organic solvent onto the transparent carbon nanotube layer to soak the transparent carbon nanotube layer;
(d) heat-pressing the transparent carbon nanotube layer on the flexible substrate;
(e) locating two electrodes on opposite ends of the flexible substrate;
(f) placing an insulative layer on edges of the surface of the flexible substrate to form a first electrode plate on the surface;
(h) repeating steps (a) to (f) to obtain a second electrode plate; and
(i) securing the first electrode plate to the second electrode plate, with the insulative layer located between the first electrode plate and the second electrode plate, and wherein the transparent carbon nanotube layer of the first electrode plate is adjacent to the transparent carbon nanotube layer of the second electrode plate.

* * * * *